US009946293B2

(12) United States Patent
Rubio et al.

(10) Patent No.: US 9,946,293 B2
(45) Date of Patent: Apr. 17, 2018

(54) MAGNETIC FORCE IN A DIRECTIONAL INPUT DEVICE

(75) Inventors: Vasco Rubio, Edmonds, WA (US); Eph John Evans, Kent, WA (US); Bill Lawrence, Duvall, WA (US); Anthony John Grant, Redmond, WA (US); Gary Strowe, Snohomish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1471 days.

(21) Appl. No.: 13/323,441

(22) Filed: Dec. 12, 2011

(65) Prior Publication Data

US 2013/0147642 A1 Jun. 13, 2013

(51) Int. Cl.
*G05G 9/047* (2006.01)
*G06F 3/0338* (2013.01)

(52) U.S. Cl.
CPC .......... *G05G 9/047* (2013.01); *G06F 3/0338* (2013.01)

(58) Field of Classification Search
CPC .......... G09G 5/08; G09G 5/00; G05G 9/047; G05G 2009/04759; G05G 2009/04774; G05G 2009/04707; G05G 9/04737; G05G 2009/04781; G06F 3/0338; G06F 2203/015; G06F 1/169; E02F 9/2004; A63F 2300/1043
USPC ....... 345/157, 156, 161; 349/192; 324/207.2
See application file for complete search history.

(56) References Cited

U.S. PATENT DOCUMENTS

| | | | |
|---|---|---|---|
| 4,533,827 A * | 8/1985 | Fincher .................. | G05G 9/047 250/214 PR |
| 5,349,881 A | 9/1994 | Olorenshaw et al. | |
| 5,724,068 A | 3/1998 | Sanchez et al. | |
| 5,829,745 A | 11/1998 | Houle | |
| 5,850,142 A * | 12/1998 | Rountos et al. ........... | 324/207.2 |
| 5,926,246 A * | 7/1999 | Tomita et al. ............... | 349/192 |
| 6,088,019 A * | 7/2000 | Rosenberg ..................... | 345/156 |
| 6,380,925 B1 | 4/2002 | Martin et al. | |
| 6,429,849 B1 * | 8/2002 | An et al. ....................... | 345/161 |
| 6,545,662 B1 * | 4/2003 | Noll ........................ | G05G 9/047 345/158 |
| 6,755,195 B1 * | 6/2004 | Lemke ................... | G05G 25/04 128/849 |
| 7,061,466 B1 | 6/2006 | Moore et al. | |
| 7,944,335 B2 * | 5/2011 | Klossek ................... | G05G 5/03 335/207 |
| 7,978,175 B2 | 7/2011 | Orsley | |

(Continued)

OTHER PUBLICATIONS

"Merritt Joystick Throttle., No Return Spring", Retrieved at <<http://store.kta-ev.com/merrittjoystkthrotnortn.aspx>>,—Retrieved Date: Sep. 26, 2011, p. 1.

*Primary Examiner* — Nay Tun
(74) *Attorney, Agent, or Firm* — Alleman Hall Creasman & Tuttle LLP

(57) ABSTRACT

Embodiments for a user input device are disclosed. In one embodiment, a user input device comprises a body, an elongate directional control element having a first end projecting towards the body and a second end projecting away from the body and configured to be movable by a user, a magnet to hold the directional control element in one or more predetermined positions, and a sensor coupled to the body to detect a change in position of the directional control element.

8 Claims, 5 Drawing Sheets

(56) References Cited

U.S. PATENT DOCUMENTS

| | | | |
|---|---|---|---|
| 8,089,459 B2* | 1/2012 | Passaro | G05G 9/047 324/207.21 |
| 2002/0097223 A1* | 7/2002 | Rosenberg | 345/157 |
| 2003/0126980 A1* | 7/2003 | Barden | E02F 9/2004 91/434 |
| 2006/0124438 A1* | 6/2006 | Bader | H01H 25/002 200/6 A |
| 2006/0238505 A1* | 10/2006 | Ahlgren | G06F 3/0338 345/161 |
| 2006/0263189 A1* | 11/2006 | Vigholm | E02F 9/2004 414/685 |
| 2006/0267933 A1 | 11/2006 | Tai et al. | |
| 2008/0202278 A1* | 8/2008 | Klossek | G05G 5/03 74/504 |
| 2010/0265176 A1* | 10/2010 | Olsson et al. | 345/161 |

\* cited by examiner

MAGNETIC FORCE IN A DIRECTIONAL INPUT DEVICE

BACKGROUND

Directional user input devices may be utilized to control a direction of movement of a physical object (e.g. an arm of a crane), or a virtual object on a graphical user interface. Such input devices may rely on a directional control element, sometimes termed a joystick or thumbstick, movable by the user to effect physical and/or virtual object movement. Such directional control elements generally are returned to a neutral rest position by spring force.

As the force exerted on the directional control element by the spring increases as the directional control element is moved farther away from the neutral position, accuracy of movement may become more difficult the farther the joystick is moved from the starting position. Additionally, the nature of the spring force in combination with frictional forces may present an area of uncertainty surrounding the neutral position. As a result, applications that utilize input from the directional control element may be configured to recognize a relatively large area of control element positions as the neutral position, thereby decreasing a sensitivity of the directional control element.

SUMMARY

Various embodiments related to the use of magnetic force in a directional input device are disclosed. For example, one disclosed embodiment provides a user input device comprising a body and an elongate directional control element having a first end projecting towards the body and a second end projecting away from the body and configured to be movable by a user. The user input device further comprises a magnet configured to hold the directional control element in one or more predetermined positions, and a sensor coupled to the body to detect a change in position of the directional control element.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, spring force mechanisms used in directional control elements for user input devices may hamper the use of such directional control elements for accurately controlling fine movements. Further, the spring mechanisms also may increase an uncertainty of a boundary of a neutral rest position to which the control element returns when not in use, due to the decrease in spring force exerted on the directional control element as it approaches the neutral rest position. This may further reduce the accuracy of such a directional control element.

Accordingly, embodiments are disclosed that relate to the use of magnetic force to bias a directional control element toward a predetermined position. Briefly, the disclosed embodiments utilize complementary magnetic elements on the directional control element and the body of the input device to produce a reverse spring effect to hold the directional control element in one or more predetermined positions. The predetermined position may include a neutral rest position, and/or one or more rest positions spaced away from the neutral rest position.

Figure 1:
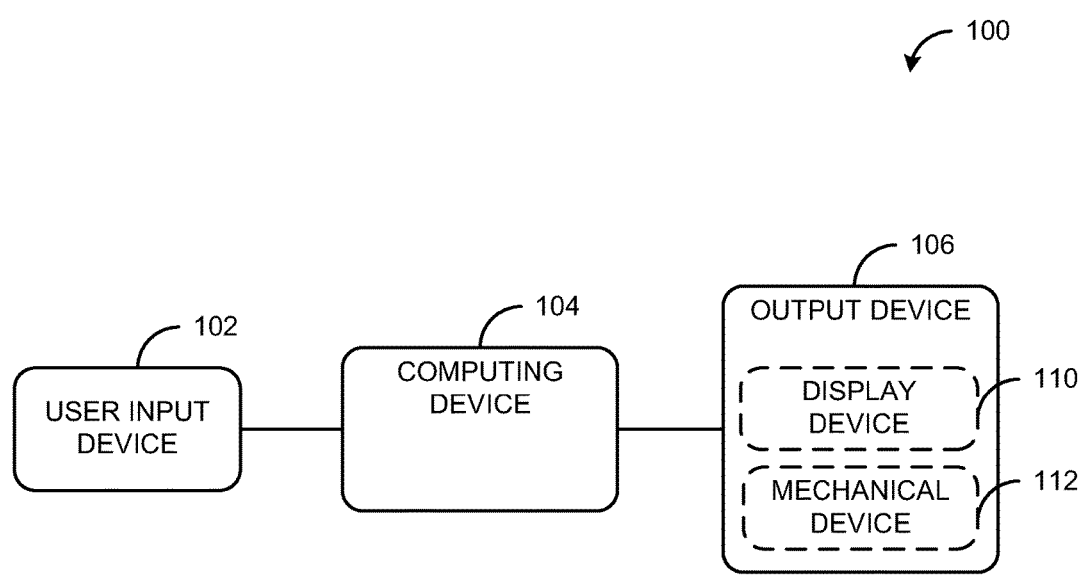
FIG. 1 shows an example use environment for a user input device according to an embodiment of the present disclosure.

FIG. 1 shows an example computing system 100. Computing system 100 includes a user input device 102. User input device 102 may be connected to a computing device 104, which may be coupled to one or more output devices 106. Computing system 100 may comprise a gaming device, for example, in order to provide input to control a video game. In other embodiments, computing system 100 may comprise a control system for a mechanical or industrial device, such as a crane, fighter jet, etc.

User input device 102 may include one or more directional control elements to receive input from a user. For example, user input device 102 may include a directional control element, such as a joystick or thumbstick, that a user may move in order to indicate a desired of an object controlled by the directional control element. User input device 102 may also include other control elements, such as buttons, that a user may push in order to input a selection. User input device 102 further may include one or more sensors configured to track movement of its respective directional control element, and output the input information to computing device 104. Example embodiments of user input device 102 are described below with respect to FIGS. 2-6.

Computing device 104 may be configured to receive input information from user input device 102, process the input information, and send the processed information to output device 106. Output device 106 may comprise any suitable device configured to accept commands from user input device 102 and to respond to the commands. For example, in some embodiments, output device 106 may include a display device 112, such as a computer monitor or television screen, on which virtual objects controllable via user input device 102 may be displayed. In other embodiments, output device 106 may include a mechanical device 114, such as an arm of a crane, for example, that may be moved in response to user input on user input device 102. It will be understood that these embodiments are described for the purpose of example, and are not intended to be limiting in any manner.

In the embodiment depicted in FIG. 1, user input device 102, computing device 104, and output device 106 are depicted as separate devices. However, in some embodiments, two or more of the devices may be included as elements in one overall device. For example, user input device 102, computing device 104, and output device 106 may all be integrated in a single device such as a handheld video game device, or industrial machine. In other embodiments, user input device 102 may be a separate structure, and computing device 104 and output device 106 may be integrated in a single device, such as an integrated personal computer and monitor.

Figure 2:
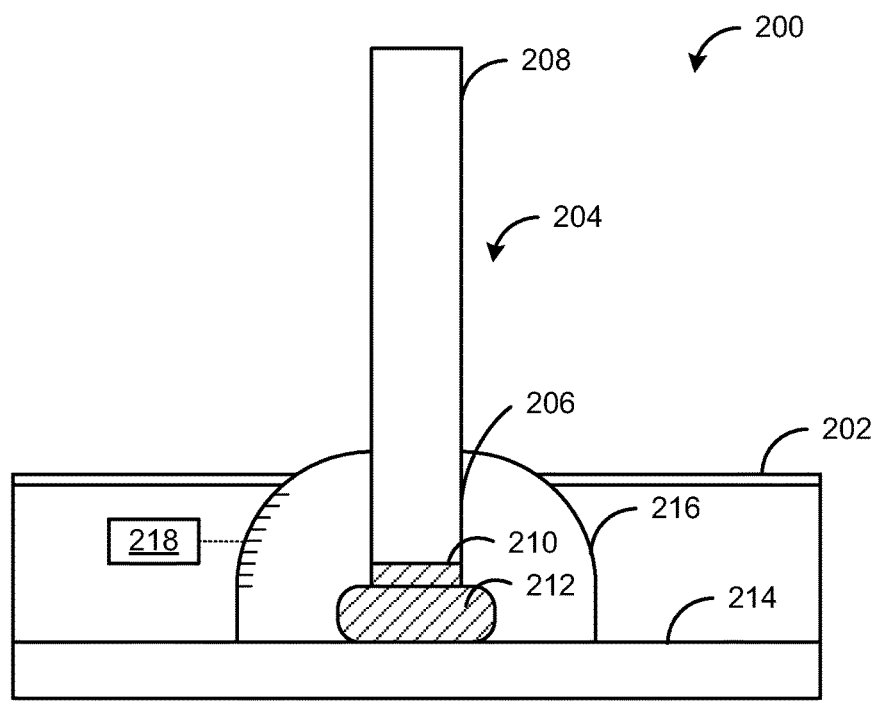
FIG. 2 shows an example user input device in a neutral rest position according to an embodiment of the present disclosure.

FIG. 2 shows a sectional view of an example user input device 200 according to an embodiment of the present disclosure. User input device 200 is one non-limiting example of user input device 102 described above with respect to FIG. 1, and may include other components not depicted in FIG. 2, such as input buttons, output to a computing device, etc.

User input device 200 includes a body 202 that may at least partially house one or more components of user input device 200 including a directional control element 204. Directional control element 204 may comprise an elongate element that includes a first end 206 that projects toward body 202 and a second end 208 which projects from body 202. Second end 208 is configured to be moveable by a user in order to affect user inputs via the user input device 200. While directional control element 204 is depicted in FIG. 2 as an elongate element similar to a shaft, directional control element 204 may be of any suitable shape. For example, directional control element 204 may include a knob- or other-shaped end element to aid in user control of directional control element 204.

Directional control element 204 may include a first magnetic element 210. The depicted first magnetic element 210 is located at an end-most portion of first end 206, but may have any other suitable location. First magnetic element 210 may be a separate element coupled to or integrated within first end 206, for example, as an insert. In other embodiments, first magnetic element 210 may comprise the entirety of directional control element 204.

First magnetic element 210 may interact with second magnetic element 212. Second magnetic element 212 may be coupled with body 202. In the example embodiment depicted in FIG. 2, second magnetic element 212 may be held in place via magnetic interaction with surface 214 within body 202, or it may be coupled within body 202 via any suitable mechanism.

First magnetic element 210 and second magnetic element 212 may interact to hold directional control element 204 in a neutral rest position, depicted here as being perpendicular to the horizontal axis of body 202. Upon movement of directional control element 204 by a user, the magnetic force holding first magnetic element 210 to second magnetic element 212 may lessen as the user moves directional control element 204 farther from the neutral position. Likewise, as the user releases directional control element 204, the magnetic force may bring directional control element 204 back into its neutral rest position. As the magnet force increases as the magnetic elements are brought back together, the neutral rest position may have less positional uncertainty relative to spring-based biasing mechanisms. Additional information regarding movement of directional control element 204 will be presented below with respect to FIG. 3.

First magnetic element 210 and second magnetic element 212 may be any suitable materials that are attracted to each other via magnetic force. In one example, first magnetic element 210 may comprises a metallic material that is attracted to a magnet, such as steel, while second magnetic element 212 may be a magnet. In another example, both first and second magnetic elements 210 and 212 may be magnets with their poles aligned such that they are attracted to each other.

The magnitude of magnetic force generated between the magnetic elements may be determined by the surface area of each element, and the material of which each element is made. For example, in one non-limiting example second magnetic element 212 may be a neodymium magnet having a thin, cylindrical shape.

A skirted housing 216 may couple directional control element 204 to body 202. Skirted housing 216 may act to prevent dirt, dust, or other debris from entering body 202 while allowing horizontal movement of directional control element 204. Skirted housing 216 also may restrict vertical movement of directional control element 204.

The position of directional control element 204 may be detected by a sensor 218 located within or coupled to body 202. In the depicted embodiment, sensor 218 comprises an optical sensor that detects a position of skirted housing 216. For example, one or more optically readable elements may be printed on, or otherwise disposed on, skirted housing 216 for tracking movement of skirted housing 216 via the optical sensor. Multiple sensors may be used in different locations around directional control element 204, in order to detect movement of directional control element 204 in multiple directions. In other embodiments, sensor 218 may be a Hall effect sensor, or any other suitable sensor that may detect movement of directional control element 204.

Figure 3:
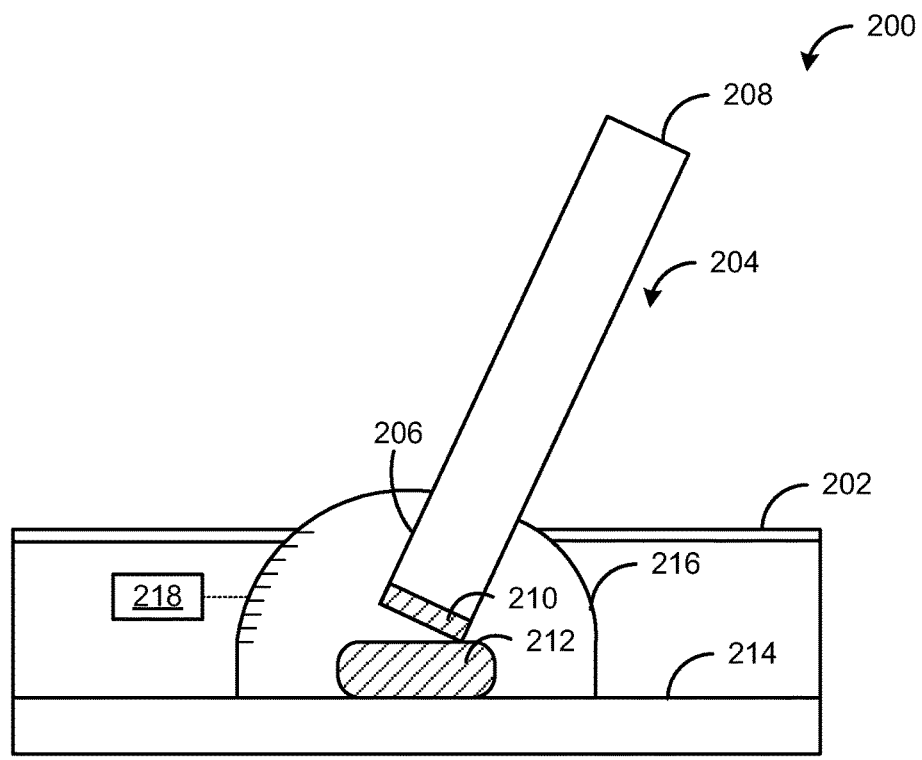
FIG. 3 shows the user input device of FIG. 2 moved from the neutral rest position.

FIG. 3 shows user input device 200 as directional control element 204 moves away from its neutral rest position. A directional force applied to directional control element 204 by a user causes the magnetic elements 210 and 212 to move apart, thereby decreasing the attractive force between the magnetic elements. The magnetic force is greatest at the point at which the directional control element 204 first moves from the neutral rest position, and lessens the farther directional control element 204 is moved away from the neutral rest position, thereby resulting in a "reverse spring" effect compared to spring-biased directional controls. The absence of a strong spring force at positional extremes that would be present in spring-based directional control elements may facilitate making precise and accurate user inputs at such positional extremes. Further, upon release of directional control element 204, the magnetic force between first and second magnetic elements 210 and 212 may bring directional control element 204 back to the starting position.

Figure 4:
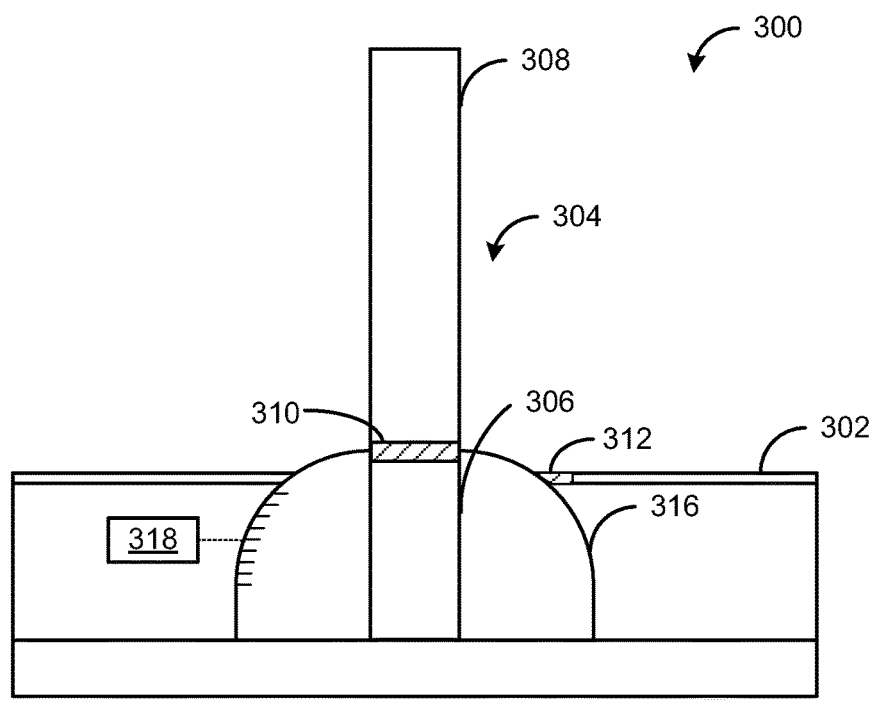
FIG. 4 shows an example user input device in a neutral position according to another embodiment of the present disclosure.
Figure 5:
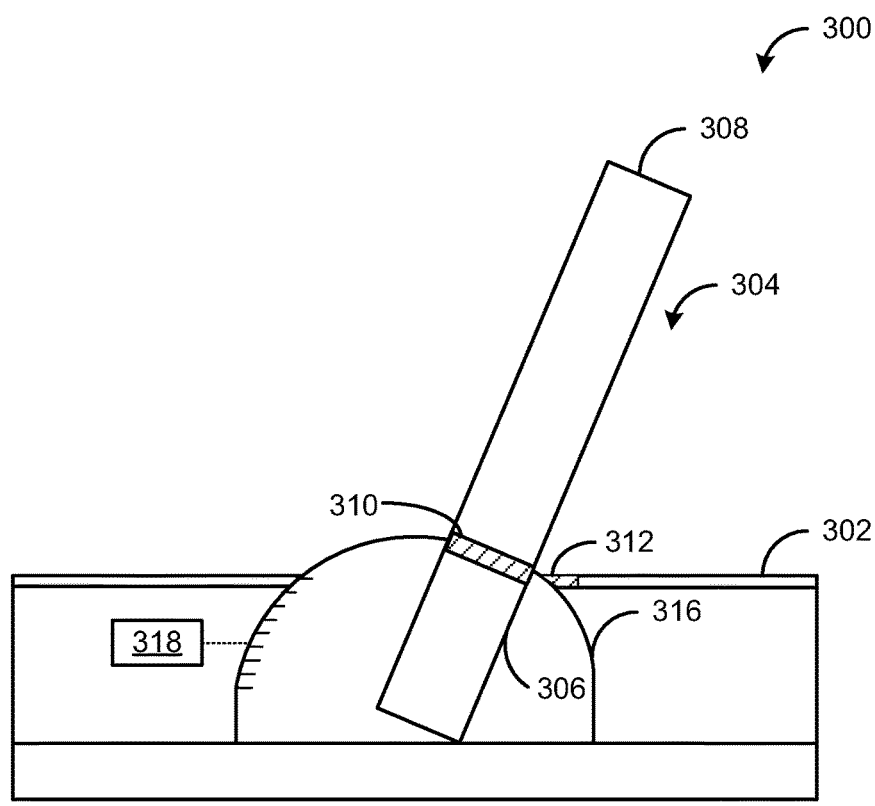
FIG. 5 shows the user input device of FIG. 4 in a non-neutral rest position.

FIGS. 4 and 5 show a user input device 300 according to another embodiment of the present disclosure. Similar to user input device 200 described with respect to FIGS. 2 and 3, user input device 300 may be one non-limiting example of user input device 102 described with respect to FIG. 1, and may contain additional elements not depicted in FIGS. 4 and 5. User input device 300 may include a body 302, directional control element 304 including first end 306 and second end 308, first and second magnetic elements 310 and 312, a skirted housing 316, and one or more sensors 318.

Directional control element 304 may have an elongate shape with first end 306 and second end 308. First end 306 may project towards body 302, and second end 308 may project away from body 302, and may be configured to be movable by a user. In some embodiments, a skirted housing 316 may allow horizontal movement of directional control element 304 while restricting vertical movement of directional control element 304. As described above, sensor 318 may be an optical sensor configured to detect movement of directional control element 304 via corresponding movement of skirted housing 316, and may be one of a plurality of sensors.

Similar to user input device 200, user input device 300 may include at least two complementary magnetic elements. However, unlike user input device 200, first magnetic element 310 may be located on directional control element 304 while second magnetic element 312 may be located at a position spaced away from the neutral rest position. In this way, second magnetic element 312 may act to hold directional control element 304 in a rest position away from the starting position rather than in the neutral rest position, as for user input device 200.

First and second magnetic elements 310 and 312 may be any suitable materials that are attracted to each other via magnetic force. In one embodiment, first magnetic element 310 may comprise a magnet, while second magnetic element 312 may comprise a metallic material.

Second magnetic element 312 may be one of a plurality of second magnetic elements spaced away from the neutral position of directional control element 304. Each second magnetic element may hold directional control element 304 in a different rest position by interacting with first magnetic element 310. As such, in some embodiments, first magnetic element 310 may comprise a cylindrical magnet in order to interact with all second magnetic elements with a consistent force from a user's perception. In other embodiments, the first magnetic element may have any other suitable shape.

The rest position or positions in which directional control element 304 is held may be detected by sensor 318, and may correspond to a particular action output to an output device. For example, in a video game that includes simulated operation of a vehicle, such as a race car, each rest position may correspond to a gear of the vehicle transmission. Additional information about the rest positions will be described below with respect to FIG. 6.

Control element 304 may be held and/or returned to the neutral rest position via any suitable mechanism. In one embodiment, directional control element 304 may be coupled to a spring (not shown) that may automatically return directional control element 304 back to its starting position. In another embodiment, directional control element 304 may interact with an additional magnetic element (not shown), such as described above with reference to the embodiment of FIGS. 2-3, in order to hold directional control element 304 in the starting position. When an additional magnetic element is used to bias directional control element 304 to its starting position, the magnetic force between the additional magnetic element and first magnetic element 310 of directional control element 304 may be set such that the force does not overcome the magnetic force between first magnetic element 310 and second magnetic element 312.

Referring specifically to FIG. 5, directional control element 304 is depicted in a rest position spaced from the neutral position. Directional control element 304 is held in the rest position via magnetic interaction between first magnetic element 310 and second magnetic element 312.

Figure 6:
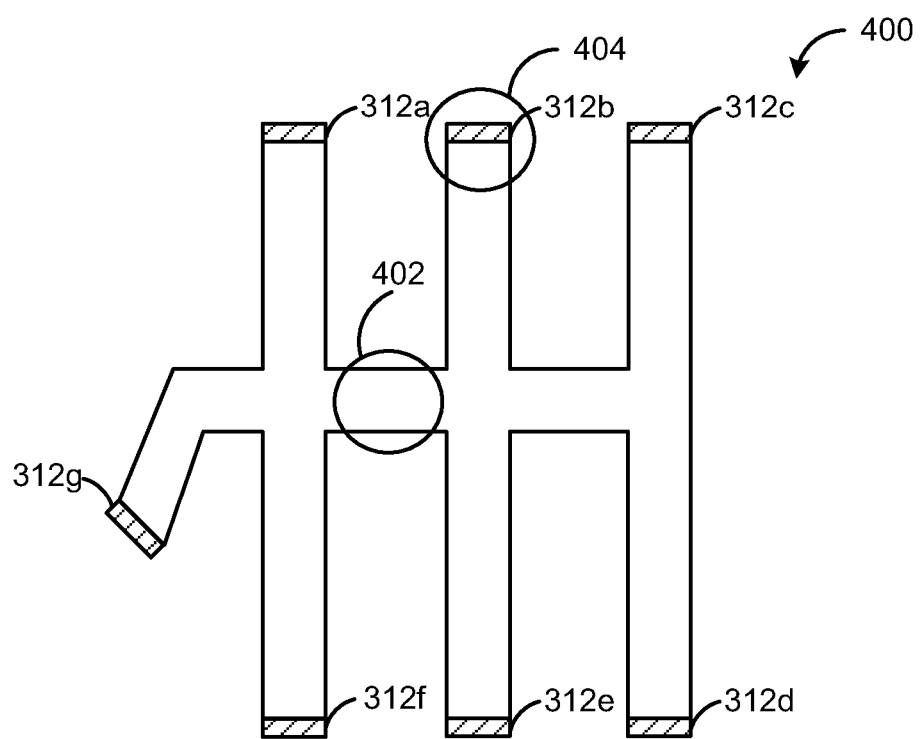
FIG. 6 shows an example patterned grid for defining a neutral position and one or more non-neutral rest positions of a user input device according to an embodiment of the present disclosure.

FIG. 6 shows an example patterned grid 400 for holding a directional control element of a user input device in one or more predetermined positions. Patterned grid 400 may be coupled to or located within a body of a user input device, such as body 302. While not depicted in FIG. 6, a directional control element, such as directional control element 304, may be positioned within patterned grid 400.

As explained above with respect to FIG. 4, directional control element 304 may have a neutral rest position, wherein directional control element 304 is held perpendicular to the horizontal axis of body 302 of input device 300. This neutral position may correspond to position 402. When directional control element 304 is moved by a user into a rest position spaced from the neutral position, as shown in FIG. 5, the rest position may correspond to position 404.

Patterned grid 400 may be configured to restrict movement of directional control element 304 into one or more predetermined positions, for example, by including material that physically restricts the movement of directional control element 304 beyond the predetermined positions. Each rest position of patterned grid 400 may hold directional control element 304 in place using a magnetic element, such as magnetic elements 312*a-g*. As explained previously, patterned grid 400 may include a plurality of rest positions, each of which correspond to a predetermined action, such as a gear of a vehicle transmission. Such a patterned grid may be used, for example, to control an electronic racing game.

Thus, FIGS. 4-6 depict an embodiment for holding a directional control element of a user input device in a plurality of predetermined positions. Multiple magnetic elements may be used to hold the directional control element in rest positions. While the embodiment depicted in FIG. 6 includes a patterned grid to hold the magnetic elements and restrict movement of the directional control element, in other embodiments the magnetic elements may be coupled with the body of the user input device without a patterned holder.

It will be understood that the embodiments described above with respect to FIGS. 1-6 may include a single magnet and one or more corresponding magnetic surfaces to hold the directional control element in one or more desired positions. Further, the relative locations of the magnet and the magnetic surface may be configured depending on desired mechanical implementations. For example, in some embodiments a magnet may be disposed on the directional control element and a corresponding magnetic surface disposed on the body of the user input device, while in other embodiments the magnet may be disposed on the body and a corresponding magnetic surface disposed on the directional control element. It also will be understood that, in some embodiments, two or more magnets may be used.

Figure 7:
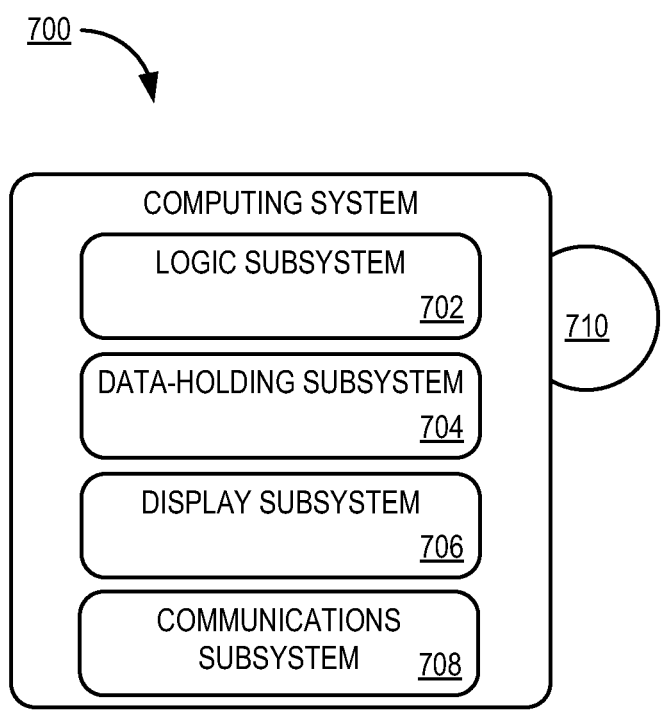
FIG. 7 shows an example embodiment of a computing device.

As mentioned above, the above described devices and methods may be tied to a computing system including one or more computers. For example, the user input devices of FIGS. 1-6, as well as the computing device 104 and/or output device 106, of FIG. 1 may, together or individually, take the form of a computing system in some embodiments. FIG. 7 schematically shows a nonlimiting computing system 700 that may perform one or more of the above described methods and processes. Computing system 700 is shown in simplified form. It is to be understood that virtually any computer architecture may be used without departing from the scope of this disclosure.

Computing system 700 includes a logic subsystem 702 and a data-holding subsystem 704. Computing system 700 may optionally include a display subsystem 706, communication subsystem 708, and/or other components not shown in FIG. 7, such as a mechanical output system. Computing system 700 may also optionally include other user input devices than a directional user input device embodiment as disclosed herein, such as keyboards, mice, game controllers, cameras, microphones, and/or touch screens, for example.

Logic subsystem 702 may include one or more physical devices configured to execute one or more instructions. For example, logic subsystem 702 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 702 may include one or more processors that are configured to execute software instructions. Additionally or alternatively, logic subsystem 702 may include one or more hardware or firmware logic machines configured to execute hardware or firmware instructions. Processors of logic subsystem 702 may be single core or multicore, and the programs executed thereon may be configured for parallel or distributed processing. Logic subsystem 702 may optionally include individual components that are distributed throughout two or more devices, which may be remotely located and/or configured for coordinated processing. One or more aspects of logic subsystem 702 may be virtualized and executed by remotely accessible networked computing devices configured in a cloud computing configuration.

Data-holding subsystem 704 may include one or more physical, non-transitory, devices configured to hold data and/or instructions executable by logic subsystem 702 to implement the herein described methods and processes. When such methods and processes are implemented, the state of data-holding subsystem 704 may be transformed (e.g., to hold different data).

Data-holding subsystem 704 may include removable media and/or built-in devices. Data-holding subsystem 704 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 704 may include devices with one or more of the following characteristics: volatile, nonvolatile, dynamic, static, read/write, read-only, random access, sequential access, location addressable, file addressable, and content addressable. In some embodiments, logic subsystem 702 and data-holding subsystem 704 may be integrated into one or more common devices, such as an application specific integrated circuit or a system on a chip.

FIG. 7 also shows an aspect of the data-holding subsystem in the form of removable computer-readable storage media 710, which may be used to store and/or transfer data and/or instructions executable to implement the herein described methods and processes. Removable computer-readable storage media 710 may take the form of CDs, DVDs, HD-DVDs, Blu-Ray Discs, EEPROMs, and/or floppy disks, among others.

It is to be appreciated that data-holding subsystem 704 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

When included, display subsystem 706 may be used to present a visual representation of data held by data-holding subsystem 704. As the herein described methods and processes change the data held by the data-holding subsystem, and thus transform the state of the data-holding subsystem, the state of display subsystem 706 may likewise be transformed to visually represent changes in the underlying data. Display subsystem 706 may include one or more display devices utilizing virtually any type of technology. Such display devices may be combined with logic subsystem 702 and/or data-holding subsystem 704 in a shared enclosure, or such display devices may be peripheral display devices.

When included, communication subsystem 708 may be configured to communicatively couple computing system 700 with one or more other computing devices. Communication subsystem 708 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 700 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A user input device, comprising:
   a body;
   an elongate directional control element having a first end positioned within the body and a second end projecting away from the body and configured to be movable by a user;
   a skirted housing;
   a magnet located on the directional control element to hold the directional control element in one or more predetermined positions;
   a magnetic element coupled with the body, the magnet configured to interact with the magnetic element such that a magnetic force applied to the directional control element decreases as the directional control element is moved from a neutral rest position to a position away from the neutral rest position;
   one or more additional magnetic elements within the body configured to interact with the magnet to hold the directional control element in one or more rest positions spaced from the neutral rest position, wherein the one or more additional magnetic elements are formed from magnetic materials; and
   an optical sensor coupled to the body to detect a change in position of the directional control element by detecting a change in position of the skirted housing.

2. The user input device of claim 1, wherein the magnet comprises a first magnet and wherein the magnetic element comprises a second magnet.

3. The user input device of claim 1, wherein the skirted housing comprises one or more optically readable elements for tracking movement of the skirted housing via the optical sensor.

4. A user input device, comprising:

a body;

an elongate directional control element having a first end positioned within-the body and a second end configured to be movable by a user;

a first magnetic element coupled to a surface of the body positioned opposite the first end of the directional control element;

a second magnetic element located on the directional control element and in contact with the first magnetic element such that attraction between the first magnetic element and the second magnetic element holds the directional control element in a neutral rest position, and such that a magnetic force acting on the directional control element from the first magnetic element decreases as the directional control element is moved from the neutral rest position to a position away from the neutral rest position, the second magnetic element resting on the first magnetic element when the directional control element is in the neutral rest position;

one or more additional magnetic elements within the body configured to interact with the second magnetic element to hold the directional control element in one or more rest positions spaced from the neutral rest position, wherein the one or more additional magnetic elements are formed from magnetic materials; and a sensor to detect a change in position of the directional control element.

5. The user input device of claim 4, wherein the sensor comprises an optical sensor configured to detect a change in position of a skirted housing coupled to the directional control element.

6. The user input device of claim 4, wherein the first magnetic element comprises a magnet coupled with the body.

7. The user input device of claim 4, wherein the second magnetic element comprises a metallic element.

8. The user input device of claim 4, wherein the second magnetic element comprises a magnet.

\* \* \* \* \*